US006171633B1

(12) United States Patent
Dulebohn et al.

(10) Patent No.: US 6,171,633 B1
(45) Date of Patent: Jan. 9, 2001

(54) MILK-BASED DRINK

(75) Inventors: Joel Dulebohn, Lansing, MI (US); Lavaughn Hill, Evergreen Park, IL (US); Ronald J. Carlotti, Grand Rapids, MI (US)

(73) Assignee: Natura, Inc., Lansing, MI (US)

( * ) Notice: Under 35 U.S.C. 154(b), the term of this patent shall be extended for 0 days.

(21) Appl. No.: 09/372,920

(22) Filed: Aug. 12, 1999

Related U.S. Application Data

(60) Provisional application No. 60/096,576, filed on Aug. 14, 1998.

(51) Int. Cl.$^7$ .............................. A23L 2/02; A23L 2/68; A23L 1/304; A23L 1/305
(52) U.S. Cl. ...................... 426/580; 426/72; 426/321; 426/324; 426/573; 426/577; 426/599
(58) Field of Search .................................. 426/580, 321, 426/324, 72, 577, 573, 599

(56) References Cited

U.S. PATENT DOCUMENTS

| 2,818,342 | 12/1957 | Ransom | 99/105 |
|---|---|---|---|
| 3,174,864 | 3/1965 | Schiebel | 99/1 |
| 3,625,702 | 12/1971 | Exler | 99/59 |
| 3,764,710 | 10/1973 | Inagami et al. | 426/185 |
| 3,996,390 | 12/1976 | Igoe | 426/573 |
| 4,031,264 | 6/1977 | Arolski et al. | 426/590 |
| 4,046,925 | 9/1977 | Igoe | 426/573 |
| 4,061,792 | 12/1977 | Inagami et al. | 426/330.2 |
| 4,212,893 | 7/1980 | Takahata | 426/330.2 |
| 4,413,017 | 11/1983 | Loader | 426/616 |
| 4,676,988 | 6/1987 | Efstathiou et al. | 426/271 |
| 5,229,161 | 7/1993 | Turk | 426/649 |
| 5,478,587 | 12/1995 | Mingione | 426/565 |
| 5,478,591 | 12/1995 | Bevers et al. | 426/592 |
| 5,766,636 | 6/1998 | Turk et al. | 424/489 |

FOREIGN PATENT DOCUMENTS

| 0 083327 B1 | 3/1985 | (EP) . |
|---|---|---|
| 0 177077 B1 | 12/1988 | (EP) . |
| 0 249446 B1 | 9/1992 | (EP) . |
| 0 617899 B1 | 7/1997 | (EP) . |
| 0 639335 B1 | 6/1998 | (EP) . |
| 8-228700 | 9/1996 | (JP) . |
| 9-172988 | 7/1998 | (JP) . |

*Primary Examiner*—Helen Pratt
(74) *Attorney, Agent, or Firm*—Quarles & Brady LLP

(57) ABSTRACT

A stable composition containing milk, fruit or vegetable juice, gum-based stabilizers, and a composition containing an amino acid, an organic acid or inorganic acid, and a metal ion is disclosed. The composition is useful as a stable beverage with a pH from 3.0 to 7.0, preferably 3.0 to 4.6.

26 Claims, No Drawings

MILK-BASED DRINK

CROSS REFERENCE TO RELATED APPLICATION

This application claims priority to U.S. Provisional application Ser. No. 60/096,576 filed Aug. 14, 1998.

BACKGROUND OF THE INVENTION

There is interest in the dairy and juice industry to combine milk and juice to form a stable, good-tasting beverage. The stability and good taste are the two biggest barriers to overcome. The current stability problem is the precipitation or curdling of milk proteins when the composition is below the isoelectric point of all such proteins.

There are several methods used to prepare milk/juice drinks at a pH around pH 4. These methods usually use sour milk or fermented milk (acidic milk) rather then sweet milk (natural pH of 6.4 to 6.7) for the drinks. There is also a series of patents teaching the addition of gum as thickeners and/or the process to stabilize the milk/juice drinks. (e.g., U.S. Pat. No. 3,625,702; U.S. Pat. No. 3,996,390; U.S. Pat. No. 4,031,264; U.S. Pat. No. 4,046,925; and U.S. Pat. No. 4,212,893).

A different approach is the removal of the cations and anions from milk and juice (see U.S. Pat. No. 4,676,988). The components, milk and juice, are prepared by cation exchange followed by anion exchange. After blending of the separately prepared ingredients, the blend is essentially homogenized and then optionally pasteurized or sterilized and/or carbonated to prepare the beverage.

U.S. Pat. Nos. 3,764,710 and 4,061,792 teach how to make stable beverages by removing the pectic substances and tannin from fruits or fruits extract. This was done by the addition of an acidified solution of proteins which coagulate, and by treating the juice with pectinase. The acidified milk is added to yield a sour juice-milk beverage.

European patent 0,083,327 described a milk/juice beverage with no need for any type of stabilizing agent and teaches the invention concerning hydrolysis of pure lactose into glucose and galactose, which are free from salts. Glucose and galactose actually acts as a binder of the proteins. The beverage can be stored for several weeks to several months.

BRIEF SUMMARY OF THE INVENTION

In one embodiment, the present invention is a milk drink comprising milk, juice, gum-based stabilizer, and a composition comprising an amino acid, an organic acid or inorganic acid, and a metal ion. The milk drink is at a pH range of 3.0 to 7.0, preferably at a pH range of 3.0 to 4.6, with little or no separation, sediments, or precipitate. These beverages can vary from a thick drink to a fluid drink and are smooth and refreshing. The beverage is nutritious and can be further enhanced with vitamins and minerals.

It is an advantage of the present invention that a milk composition is disclosed in which milk may be combined with vegetable or fruit juice without separation, sediments, or precipitate.

Other advantages, features, and objects of the present invention will become apparent to one of skill in the art after one reviews specifications and claims.

DETAILED DESCRIPTION OF THE INVENTION

In one embodiment, the present invention is the combination of gum-based stabilizer and a composition comprising an amino acid, an organic acid or inorganic acid, and a metal ion used to stabilize a milk/juice combination at both room temperature and refrigerated temperature. Typically, these beverages are stable for up to one year. A preferred beverage of the present invention is stable at room temperature for up to one year, preferable for up to six months, and more preferably at least two weeks. In another embodiment of the present invention, the beverage is stable at refrigerated temperatures for up to one year, preferably up to 6 months, and more preferably at least two weeks.

In a preferred version of the present invention, a milk emulsion is created from a combination of milk and fruit juice or milk and vegetable juice. By "juice" we mean to include any product containing fruit or vegetable juice, such as drinks, jams, jellies and other fruit and vegetable products. Preferred juices include apple juice, orange juice, pineapple juice, cherry juice, grape juice, grapefruit juice, lemon juice, melon juice, strawberry juice, black cherry juice, lemon-lime juice, mango juice, papaya juice, cranapple juice, fruit punch juice, peach juice, guava juice, tangerine juice, apricot juice, and cranberry juice. Juice drinks, such as lemonade, orangeade and fruit punch. Fruit products, such as jams and jellies, are also preferred. In another embodiment of the present invention, the emulsion is created from a combination of milk and vegetable juices or milk and mixed vegetable and fruit juices.

The present invention is designed to work with all dairy and milk products, including fermented milk. For example, a mixed yogurt and fruit emulsion is specifically envisioned.

We believe that the composition comprising an amino acid, an organic acid or inorganic acid, and a metal ion stabilizes the milk proteins by binding the proteins and preventing denaturation and precipitation in the more acidic environment of the fruit juice drink. A composition comprising an amino acid, an organic acid or inorganic acid, and a metal ion has carboxylic acids, hydroxyl, amine functional groups and metal ions to bind the milk protein.

The specific gravity of the composition of amino acid, inorganic/organic acids, and metal ion source can vary from 1.0 to 1.5 g/ml; the typical value varies 1.2 to 1.3 g/ml. The specific gravity of milk and juice can be brought closer together using the composition of amino acid, inorganic/organic acids, and metal ion source to permit an overall final specific gravity for the beverage. The addition of the composition of amino acid, inorganic/organic acids and metal ion source is important to maintain the milk/juice emulsion in a pH range of, preferably, pH 3.0 to pH 4.6.

The composition comprising an amino acid, an organic acid or inorganic acid, and a metal ion is a mixture of amino acids (including proteins and peptides), metal ions source (such as Group IA, IIA, Ti, V, Cr, Mn, Co, Ni, Cu and Zn), organic acids and inorganic acids. Typically, the organic acids are mono, di, tri, poly carboxylic acids and may contain other functional groups such as $NH_2^-$, $OH-$, $PO_4^{-3}$, and $SO_4^{-2}$. Typically, the inorganic acids are hydrochloric acid, sulfuric acid and phosphoric acid. The molar ratio of metal ion:amino acid:acid can vary depending on the applications. The molar ratio of amino acid to metal ion can vary from 0.1 to 20. The acids to metal ion molar ratio can vary from 0.1 to 20. The most common molar ratio for food application has amino acid varying from 0.1 to 4, and the acid varying from 0.1 to 4.

These molar ratios keep the composition comprising an amino acid, an organic acid or inorganic acid, and a metal ion in the pH range of 3–8 for most of the food applications. A typical example of preparation of a composition comprising an amino acid, an organic acid or inorganic acid, and a metal ion is shown below:

1571.5 g water 1155.1 g lysine HOH (7.03 mole)

189.1 g MgO (4.69 mole)

1365.1 g malic acid (2.72 mole)

654.5 g citric acid (3.41 mole)

The pH of this solution varies from 3.6 to 3.8 and is approximately 65% solution. The preferred ration of lysine HOH:metal oxide:organic acids is 1.5:1.0:1.31.

This is the preferred formula of a composition comprising an amino acid, an organic acid or inorganic acid, and a metal ion. However, other versions of the composition can be used. Instead of lysine, other amino acids, peptides and proteins can be used and one may substitute different metal ions, such as calcium, zinc, iron and others. For example, the pH may vary between 3.0 and 8.0. The organic acids can be varied and the ratio of the organic acids can be varied.

The milk portion of the composition can vary from 5% to 80% and the juice portion can be varied from 5% to 80%. 40% milk/40% (38–42%/38–42%) juice is the optimum preparation. The juice may be either pulp or pulp-free juice. As this ratio of milk/juice varies, the amount of sugar, gum-base stabilizer, a composition comprising an amino acid, an organic acid or inorganic acid, and a metal ion, and flavors also have to vary to prepare these stable drinks. The sugar portion is from 0% to 25%; gum-base stabilizer portion is from 0.01 to 3%; and a composition comprising an amino acid, an organic acid or inorganic acid, and a metal ion is from 0.001% to 3%.

Typically, one first blends sugars and one or more gums (e.g., pectin, alginate, and carboxymethyl cellulose, or other gum-based stabilizers). Gums and sugar are then added to whole milk. A composition comprising an amino acid, an organic acid or inorganic acid, and a metal ion is then blended with the whole milk. The pH of the whole milk is typically approximately 6.5. To the whole milk solution, juice is added, and the pH of the mixture will be dropped to 4.6 or below with a citric acid solution.

If the method of the present invention is not used, undesirable results begin usually at around a pH of 5.0 when the milk protein starts to coagulate and two layers begin to form (the bottom layer will be milk proteins, and the top layer will be a liquid).

The ranges of suitable concentrations for a composition comprising an amino acid, an organic acid or inorganic acid, and a metal ion are preferably 0.001% to 3% of a 65% solution (w/w). Preferably, 65 g of a composition comprising an amino acid, an organic acid or inorganic acid, and a metal ion is added to 35 g of water and this is added to the emulsion at 0.001% (10 ul/L of emulsion) or to 3% (3 ml per 100 ml of emulsion).

EXAMPLES

Example 1

Whole Milk and Frozen Pulp Orange Juice (50:50)

10 grams of pectin 1694 (TIC Gums) were added to 500 grams of whole milk and mixed until dissolved. 2.0 gram of a composition comprising an amino acid, an organic acid or inorganic acid, and a metal ion (65% solid solution) was added and mixed well. While stirring, 500 grams orange juice made from frozen pulp orange juice was added. The beverage was poured into a beaker and microwaved on a high setting until the temperature is between 85° C. to 90° C. for 30 seconds. The beverage was placed in a sterile container and cooled in a water bath. The beverage was stored at room temperature (72° C.) or refrigerator temperature (40° C.). The beverage was stable (one phase) at both room temperature and refrigerator temperature for at least 6 months.

Example 2

Whole Milk and Frozen Pulp Orange Juice (50:50)

2.0 grams of a composition comprising an amino acid, an organic acid or inorganic acid, and a metal ion (65% solid solution) were added to 500 grams of whole milk and stirred using a blender at the "stir" setting for a few seconds. While stirring, 8.5 grams of pectin 1694 (TIC Gums) were added. When all the pectin 1694 was added, the blender setting was changed to "liquefy," and the beverage was liquefied for 1 minute. The gum was then hydrated for ten to fifteen minutes. While stirring, 500 grams orange juice made from frozen pulp orange juice were added. While stirring, 85 grams of sugar, 1.45 grams of mango flavor and 1.45 grams of orange flavor were added. The blender was set to "liquefy" setting and the beverage was blended for 30 seconds. The beverage was poured into a beaker and left to set for 5 minutes. The beverage was microwaved on a high setting until the temperature was between 85° C. to 90° C. for 30 seconds. The beverage was placed in a sterile container and cooled in a water bath. The beverage was stored at room temperature (72° C.) or refrigerator temperature (40° C.). The beverage was stable (one phase) at both room temperature and refrigerator temperature for at least 6 months.

Example 3

Whole Milk and Frozen Pulp-Free Orange Juice (50:50)

2.0 gram of a composition comprising an amino acid, an organic acid or inorganic acid, and a metal ion (65% solid solution) were added to 500 grams of whole milk and stirred using a blender at the "stir" setting for a few seconds. While stirring, 8.5 grams of pectin 1694 (TIC Gums) were added. When all the pectin 1694, was added the blender setting was changed to the "liquefy," and the beverage was liquefied for 1 minute. The gum hydrated for ten to fifteen minutes. While stirring, 500 grams orange juice made from frozen pulp-free orange juice were added. While stirring, 85 grams of sugar, 1.45 grams of mango flavor and 1.45 grams, of orange flavor were added. The blender was set to "liquefy" setting and the beverage was blended for 30 seconds. The beverage was poured into a beaker and left to set for 5 minutes. The beverage was microwaved on a high setting until the temperature was between 85° C. to 90° C. for 30 seconds, placed in a sterile container, and cooled in a water bath. The beverage was stored at room temperature (72° C.) or refrigerator temperature (40° C.). The beverage was stable (one phase) at both room temperature and refrigerator temperature for at least 6 months.

Example 4

Whole Milk and Frozen Pulp-Free Orange Juice (50:50) pH Adjustment 85 grams of sugar was added to 500 grams of whole milk, and 8.5 grams of pectin 1694 (TIC Gums). When all the pectin 1694 was added the blender setting was changed to liquefy, and the beverage was liquefied for 2 minutes. 2 grams of a composition comprising an amino acid, an organic acid or inorganic acid, and a metal ion (65% solid solution) was added and the mixture was blended for two minutes. The solution stood for 10 minutes. While stirring, 500 grams orange juice made from frozen pulp-free orange juice was added. The blender was set to "liquefy" setting and the beverage was blended for two minutes. The pH of the beverage was 4.5; the pH of the beverage was adjusted to 4.2 with a 50% solution of citric acid. The beverage was microwaved on a high setting until the temperature was between 85° C. to 90° C. for 30 seconds, placed in sterile container, and cooled in a water bath. The beverage was stored at room temperature (72° C.) or refrigerator temperature (40° C.). The beverage was stable (one phase) at both room temperature and refrigerator temperature for at least 6 months.

Example 5

Whole Milk and Frozen Apple Juice (50:50)

2.0 gram of a composition comprising an amino acid, an organic acid or inorganic acid, and a metal ion (65% solid solution) was added to 500 grams of whole milk and stirred using a blender at the "stir" setting for a few seconds. While stirring, 8.5 grams of pectin 1694 was added. When all the pectin 1694 (TIC Gums) was added, the blender setting was changed to "liquefy," and the beverage was liquefied for 1 minute. The gum hydrated for ten to fifteen minutes. While stirring, 500 grams apple juice made from frozen apple juice were added. 80 grams sugar, 1.45 grams mango flavor and 1.45 gram orange flavor was added while stirring. The blender was set to liquefy setting and the beverage was blended for 30 seconds. The beverage was poured into a beaker and left to set for 5 minutes. The beverage was microwaved on a high setting until the temperature was between 85° C. to 90° C. for 30 seconds, placed in sterile container and cooled in a water bath. The beverage was stored at room temperature (72° C.) or refrigerator temperature (40° C.). The beverage was stable (one phase) at both room temperature and refrigerator temperature for at least 6 months.

Example 6

Whole Milk and Frozen Pulp Orange Juice (45:45)

450 grams of whole milk was added to 100 grams water. 2.0 grams of a composition comprising an amino acid, an organic acid or inorganic acid, and a metal ion (65% solid solution) was then added and stirred using a blender at the "stir" setting for a few seconds. With stirring, 8.5 grams of pectin 1694 (TIC Gums) were added. When all the pectin 1694 was added, the blender setting was changed to "liquefy," and the beverage was liquefied for 1 minute. The gum hydrated for ten to fifteen minutes. 450 grams orange juice made from frozen pulp orange juice were added. With stirring, 85 grams sugar, 1.45 grams mango flavor and 1.45 grams orange flavor was added. The blender was set to "liquefy" setting, and the beverage was blended for 30 seconds. The beverage was poured into a beaker and left to set for 5 minutes. The beverage was microwaved on a high setting until the temperature was between 85° C. to 90° C. for 30 seconds, placed in sterile container, and cooled in a water bath. The beverage can be stored at room temperature (72° C.) or refrigerator temperature (40° C.). The beverage was stable (one phase) at both room temperature and refrigerator temperature for at least 6 months.

Example 7

Whole Milk and Frozen Pulp Orange Juice (25:75)

5 grams of pectin 1694 (TIC Gums) was added to 250 g of whole milk and liquefied for 2 minutes. 1.0 gram of a composition comprising an amino acid, an organic acid or inorganic acid, and a metal ion (65% solid solution) was added with stirring. The gum was left to hydrate for ten minutes. 750 grams orange juice made from frozen pulp orange juice were added. The blender was set to "liquefy" setting and the beverage was blended for 30 seconds. The beverage was microwaved on a high setting until the temperature was between 85° C. to 90° C. for 30 seconds, placed the beverage in sterile container, and cooled in a water bath. The beverage was stored at room temperature (72° C.) or refrigerator temperature (40° C.). The beverage was stable (one phase) at both room temperature and refrigerator temperature for at least 6 months.

Example 8

Whole Milk and Frozen Pulp Orange Juice (25:25)

3.18 grams of pectin HM (TIC Gums) was added to 250 grams of whole milk and stirred. 2 grams of a composition comprising an amino acid, an organic acid or inorganic acid, and a metal ion (65% solid solution) 120 grams of sugar were stirred in. The solution was liquefied for one minute. 250 grams orange juice made from frozen pulp orange juice, and 425 grams of water were added and liquefied for one minute. The beverage was left to stand for ten minutes. The beverage was microwaved on a high setting until the temperature was between 85° C. to 90° C. for 30 seconds, placed in sterile container, and cooled in a water bath. The beverage was stored at room temperature (72° C.) or refrigerator temperature (40° C.). The beverage was stable (one phase) at both room temperature and refrigerator temperature for at least 6 months.

We claim:

1. A stable mixture comprising milk, juice, gum based stabilizers, and a composition comprising an amino acid, an organic acid or inorganic acid, and a metal ion, wherein the pH of the mixture may be between 3.0 and 7.0 and wherein the mixture does not separate into separate phases.

2. The mixture of claim 1 wherein the pH of the mixture is between 3.0–4.6.

3. The mixture of claim 1 wherein the milk is selected from the group consisting of whole milk, 2% milk, fat free milk, acidified milk, fermented milk, buttermilk and yogurt.

4. The mixture of claim 1 wherein the portion of milk is between 5% to 80% (v/v) of the composition.

5. The mixture of claim 1 wherein the juice is pulp or pulp-free juice.

6. The mixture of claim 1 wherein the juice is obtained from fruit selected from the group consisting of apple, orange, pineapple, cherry, grape, grapefruit, lemon, melon, strawberry, black cherry, lemon-lime, mango, papaya, cranapple, fruit punch, peach, guava, tangerine, apricot, and cranberry.

7. The mixture of claim 1 wherein the portion of juice is between 5% to 80% (g/g).

8. The mixture of claim 1 wherein the gum-based stabilizer is between 0.01% to 3% of the total composition.

9. The mixture of claim 1 wherein the gum-based stabilizer is selected from the group consisting of pectin, alginate, carboxymethyl cellulose, locust bean gum, xanthan gum, gellan gum, guar gum, carrageenan, gum ghatti, karaya gum, tragacanth, and gelatin.

10. The mixture of claim 1 wherein the composition comprising an amino acid, an organic acid or inorganic acid, and a metal ion (65% solid) solution has the formula: 1571.5 g water, 1155.1 g lysine HOH (7.03 mole), 189.1 g MgO (4.69 mole), 1365.1 g malic acid (2.72 mole), and 654.5 g citric acid (3.41 mole) and the pH of the solution varies from 3.6 to 3.8 and is approximately 65% solution.

11. The mixture of claim 1 wherein the a composition comprising an amino acid, an organic acid or inorganic acid, and a metal ion has the ratio of lysine HOH:metal oxide::organic acids of 1.5:1.0:1.31 and the portion of the composition within the mixture is from 0.001% to 1%.

12. The mixture of claim 1 additionally comprising a sweetener for the beverage, selected from the group consisting of high fructose corn syrup, corn syrup, glucose, fructose, honey, and lactose.

13. The mixture of claim 1 additionally comprising a high intensity sweetener from the group consisting of acesulfame K, sucralose, aspartame, and alitame.

14. The mixture of claim 1 wherein the pH of the composition was initially above 4.6, and the pH was adjusted to 4.6 or below with the addition of the at least one organic acid selected from the group of citric acid, malic acid, succinic acid, lactic acid, tartaric acid, gluconic acid, and ascorbic acid.

15. The mixture of claim 1 wherein the composition is heated by microwave, conventional heating, induction, solar convention, and direct electrical resistance methods for sterilization.

16. The mixture of claim 15 wherein the juice is selected from the group consisting of carrot, celery, cabbage, tomato, vegetable juice, and mixed vegetable juice.

17. The mixture of claim 1 wherein the composition is packaged in a sterile container.

18. The mixture of claim 1 wherein the juice is a vegetable juice.

19. The mixture of claim 1 with an additive selected from the group consisting of caffeine, vitamins (pyridoxine, riboflavin, vitamin D, niacin, phylloquinone), minerals (Ca, Mg, Fe, Co, Zn, Mn, Cr(III), Cu, Mo, P, Se) folic acid, ginkgo, garlic, isoflavones, L-carnitine, licorice, beta-carotene, peppermint, polyphenol, herbal extracts, and botanicals.

20. The mixture of claim 1 wherein the juice is prepared from fruit products such as jams and jellies.

21. The mixture of claim 1 comprising alcohol.

22. The mixture of claim 1 wherein the beverage is carbonated.

23. The mixture of claim 1 wherein the mixture is a nutritionally complete meal replacement.

24. The mixture of claim 1 wherein the mixture does not separate into separate phases for at least 2 weeks at room temperature.

25. The mixture of claim 1 wherein the milk is between 38% and 42% and the juice is between 38% and 42%.

26. The mixture of claim 1 wherein the mixture is stirred, blended, homogenized or otherwise mixed.

* * * * *